United States Patent [19]

Hopper

[11] 4,080,532
[45] Mar. 21, 1978

[54] FERROELECTRIC IMAGING SYSTEM

[75] Inventor: George S. Hopper, Plano, Tex.

[73] Assignee: Texas Instruments Incorporated, Dallas, Tex.

[21] Appl. No.: 796,785

[22] Filed: May 13, 1977

Related U.S. Application Data

[63] Continuation of Ser. No. 644,405, Dec. 29, 1975, abandoned.

[51] Int. Cl.² .......................................... H01J 31/49
[52] U.S. Cl. .................................. 250/332; 250/330
[58] Field of Search ............... 250/330, 332, 333, 334

[56] References Cited

U.S. PATENT DOCUMENTS

| | | | |
|---|---|---|---|
| 3,786,269 | 1/1974 | Cooper | 250/332 X |
| 3,808,435 | 4/1974 | Bate et al. | 250/332 |
| 3,919,555 | 11/1975 | Singer | 250/332 |
| 3,932,753 | 1/1976 | Stotlar | 250/332 |

*Primary Examiner*—Archie R. Borchelt
*Attorney, Agent, or Firm*—Rene' E. Grossman; Alva H. Bandy

[57] ABSTRACT

A ferroelectric imaging system is taught. The system comprises a lens system, detector matrix, drive and readout electronics, controller, video processor and display. The lens system is a lens system for focusing electromagnetic energy from a scene onto a detector matrix. The drive and readout electronics selectively bias the elements of the detector matrix, and readout voltage signals indicative of the infrared energy impinging on each element of the detector matrix. The controller section includes clocks and shift registers, respectively, for timing the electronic drive and readout electronics, and for selecting in a desired order the matrix elements for readout. The controller also controls the readout signal input to the video processor which processes the voltage signal output of the detector matrix into video signals. The video signals are applied to a display means such as, for example, a cathode ray tube for display. The detector matrix includes a ferroelectric optical transducer which includes a body of ferroelectric material and a plurality of orthogonal leads formed on opposing major surfaces of the ferroelectric material. The detector matrix is mounted upon a heated substrate in a vacuum housing having an appropriate energy transmitting window. The body of ferroelectric material and orthogonal leads form a plurality of thermal sensitive capacitors with the ferroelectric material acting as the dielectric and the orthogonal leads as plates. The plurality of capacitors is divided into two portions; one portion receiving energy to vary their capacitance in proportion to the energy received, and a second portion shielded from the energy to provide reference capacitors. The thermal responsive capacitors and reference capacitors are arranged with the drive and output electronics to form a bridge having an output voltage indicative of the thermal energy detected.

28 Claims, 10 Drawing Figures

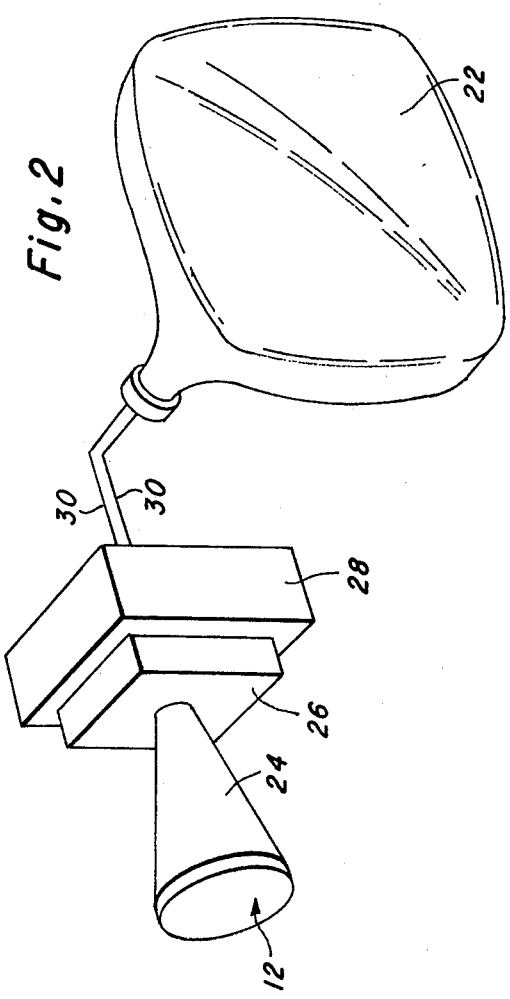
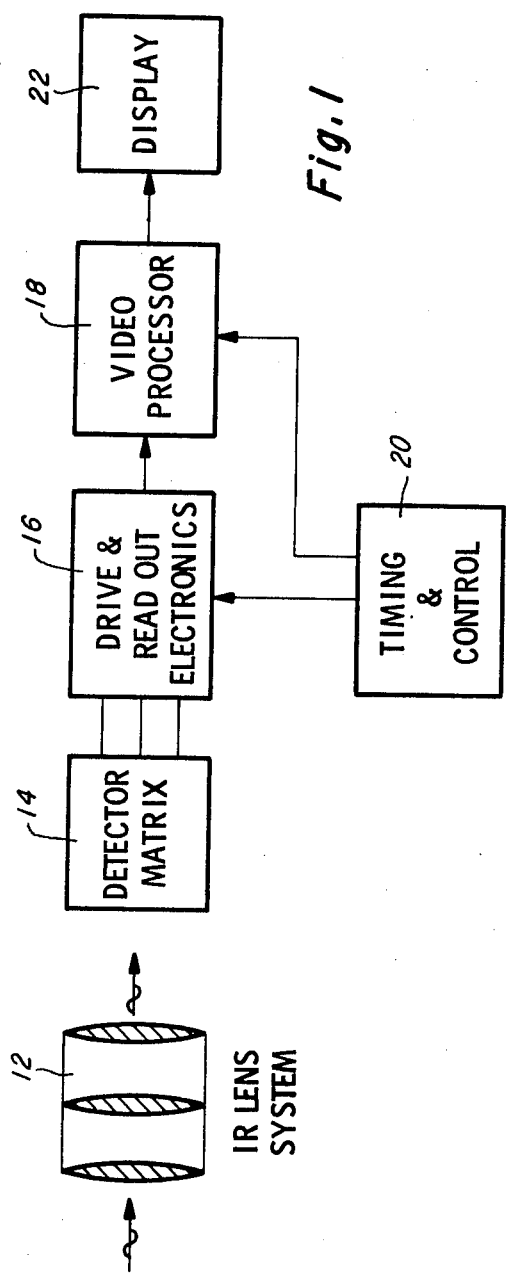

FERROELECTRIC IMAGING SYSTEM

This is a continuation, of application Ser. No. 644,405, filed Dec. 29, 1975, now abandoned.

This invention relates to thermal imagers, and more particularly, to a ferroelectric imaging system.

In the past, thermal imaging systems have included an image moving optics for focusing an image on a linear array of quantum detectors, a cryogenic cooler for cooling the detector array to an operating temperature, a linear array of emitters coupled to the array of quantum detectors for producing output signals indicative of an image of the scene, and a derotation member in the path of the emitter output signals for unscrambling the visible image of the scene. Such prior art systems have many disadvantages. For example, for scanning a scene either the scanning mirrors must be scanned or the detector mechanism rotated to produce an image; therefore, these systems have all the problems attending mechanical mechanisms having moving parts. Further the quantum detectors require expensive, complex cryogenic coolers to maintain them at operating temperatures. Many problems attend systems which must be operated at temperatures of 77° K and below. Such problems stem from the use of sophisticated metals, materials and components necessary to produce images. The systems are bulky, weighty, and not readily susceptible to mass production techniques are of marginal performance and have a lifetime limited by the cooling system.

Accordingly, it is an object of this invention to provide an improved thermal imager.

Another object of this invention is to provide a thermal imager system operable at near ambient temperatures.

Still another object of the invention is to provide a thermal imager having no moving parts.

Yet another object of this invention is to provide a ferroelectric imager system.

A further object of the invention is to provide a thermal imager having a flexible TV compatible output format.

Still a further object of the invention is to provide a thermal imager which is compact, light in weight, economical to fabricate and capable of being mass produced.

Briefly stated, the invention comprises a lens system, a detector matrix, drive and readout electronics, a video processor, a controller, and a display mechanism. The lens system focuses thermal energy from a scene onto the detector matrix. The detector matrix comprises a plurality of thermal sensitive elements operable at near ambient temperatures to detect thermal energy impinging thereon. The drive and readout electronics electrically bias the elements of the detector matrix and reads out electrical signals representative of the thermal energy impinging on the detector matrix. The video processor receives the electrical signals representative of the thermal energy impinging on the detector matrix and processes the signals into video signals for display by the display mechanism. The controller includes a timer and control mechanism for the drive and readout electronics and video processor for selectively energizing the elements of the detector matrix, and reading out the signals representative of the image in a TV compatible format for display by a cathode ray tube.

The novel features believed to be characteristic of this invention are set forth in the appended claims. The invention itself, however, as well as other objects and advantages thereof may best be understood by reference to the following detailed description of an illustrative embodiment when read in conjuction with the accompanying drawings in which:

FIG. 1 is a block diagram of the ferroelectric imaging system;

FIG. 2 is an isometric view of the ferroelectric imaging system;

Figure 5A:
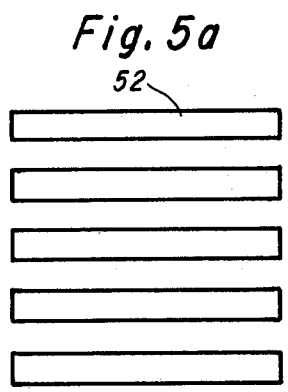
Figure 6:
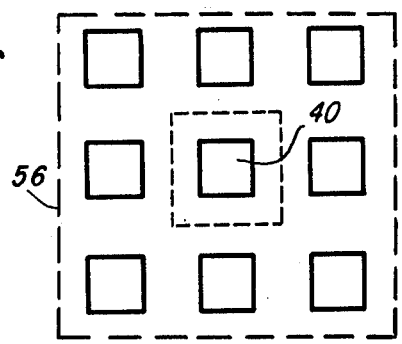
Figure 7:
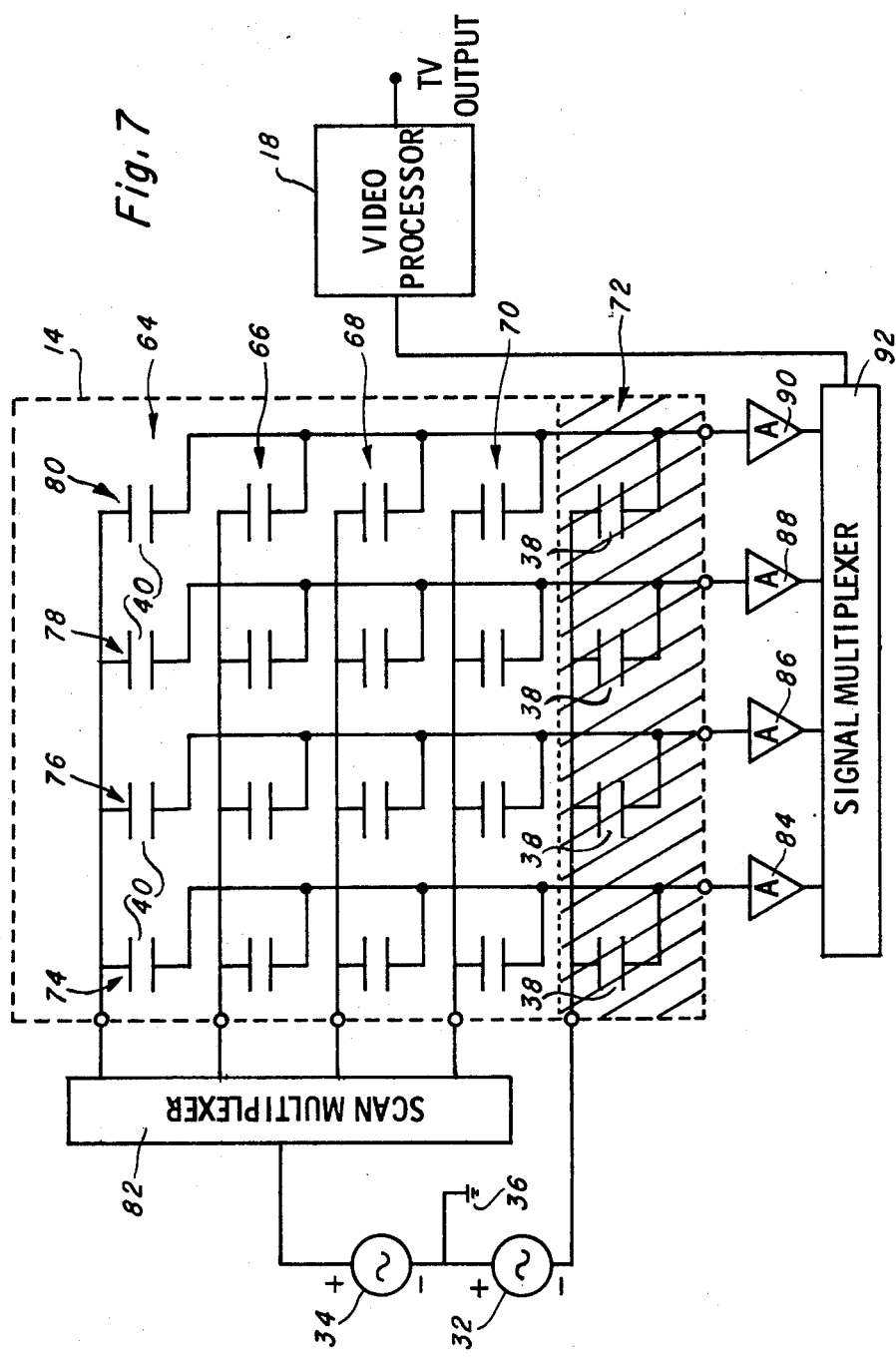

FIGS. 5a, b and c depict fabrication of the capacitor matrix;

FIG. 6 depicts the resolution area of each element of the detector matrix;

FIG. 7 is a schematic view of an addressable matrix array; and

Figure 8:
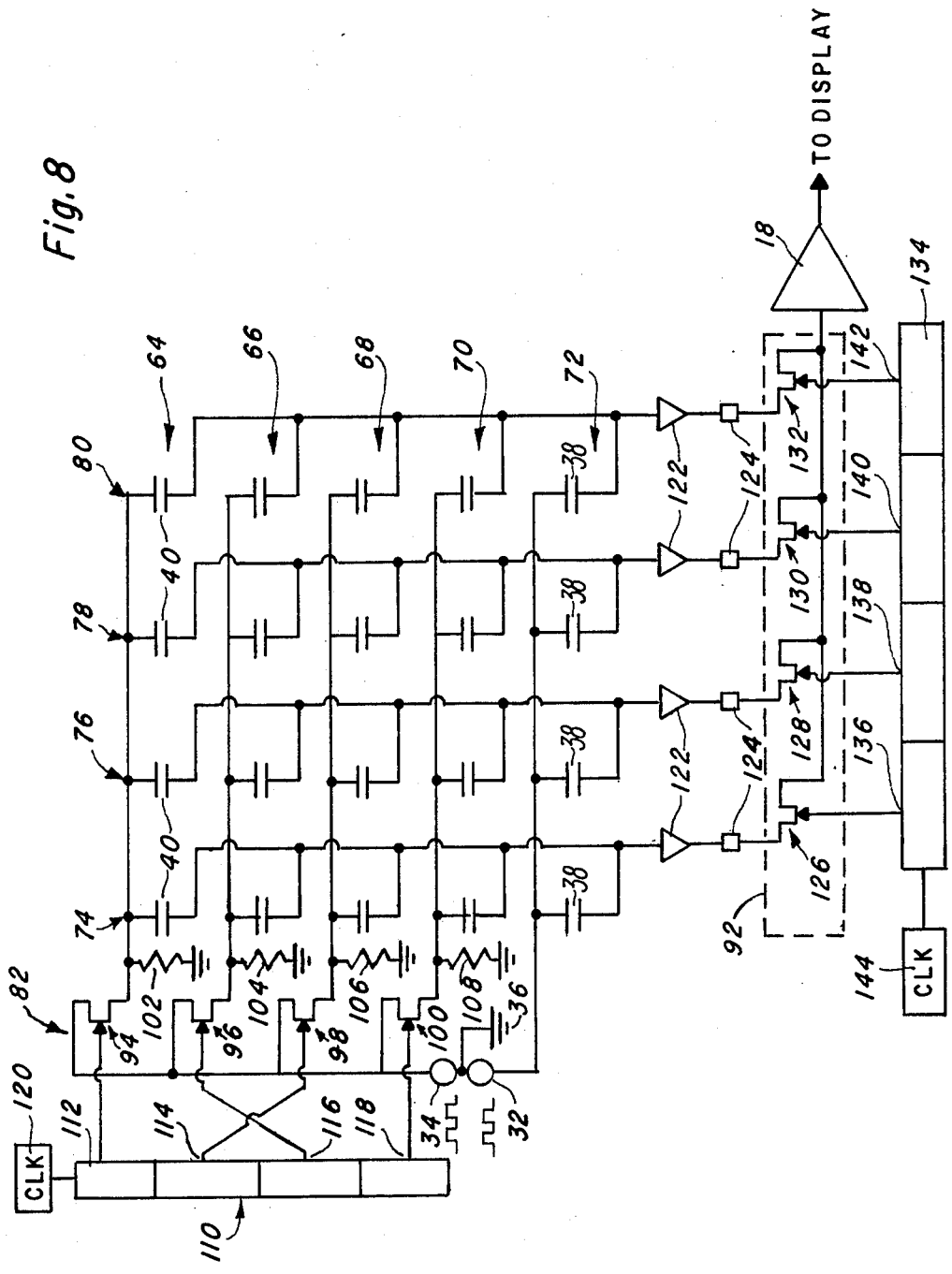

FIG. 8 is a schematic view showing in greater detail the addressable matrix array of FIG. 7.

Referring now to FIG. 1, the thermal imager system 10 comprises a lens system 12, a detector matrix 14, drive and readout electronics 16, a video processor 18, a timing and control means 20, and a display means 22. The lens system 12 may be, for example, an infrared lens system having an object lens, correction lens, and a focusing lens for focusing thermal energy emanating from a scene (not shown) onto the detector matrix 14. It will be understood by those skilled in the art that various types lens systems exist capable of performing the desired optical functions. The detector matrix 14 includes a plurality of thermal energy sensors and reference elements for producing electrical signals representative of the thermal energy impinging on the sensors for the video processor 18. The detector matrix 14 is more fully described hereinafter in detail. The video processor 18 processes the display signals representative of the scene into display signals for display by the display means 22. The display means 22 may be, for example, a cathode ray tube. The drive and readout electronics 16 is connected to the detector matrix 14 for biasing the thermal sensors and reference elements, and reading out electrical signals representative of the scene. The timing and control mechanism 20 guides the action of the drive and readout electronics 16, and video processor 20 to selectively produce signals of the scene in a desired format for display by display means 22.

Referring now to FIG. 2, the lens system 12 is a cylindrical lens system mounted in housing 24. The housing 24 is rigidly attached to detector matrix housing 26. Thus, the lens system is a staring system; that is, neither the lens system 12 nor the detector matrix 14 move for scanning. The detector matrix housing 26 is mounted in a housing 28. The housing 28 houses the drive and readout electronics 16, video processor 18 and timing and control mechanism 20 (FIG. 1). Leads 30 connect the video processor output to the cathode ray tube display 22 (FIG. 2).

Figure 3:
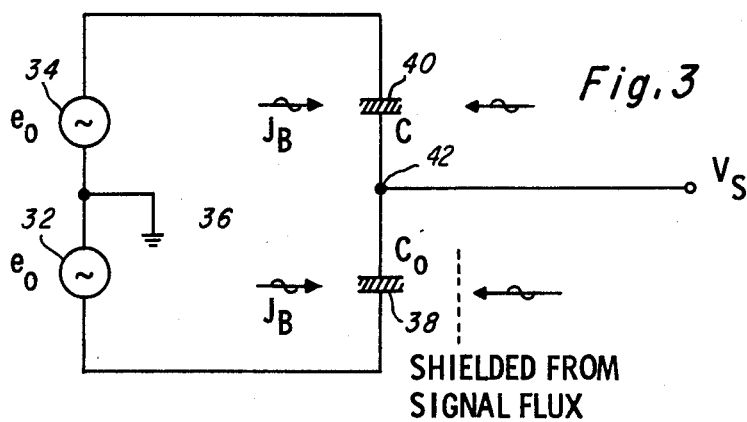
FIG. 3 is a schematic diagram illustrative of the ferroelectric optical transducer signal generation technique.

The detector technique or principle utilized in the ferroelectric imaging system is illustrated in FIG. 3. FIG. 3 is for illustrative purposes only and is not to be considered limitative of the detector matrix strucutre. As shown, a pair of signal generators 32 and 34 have terminals coupled to a common ground 36. The signal generators 32 and 34 are coupled, respectively, to a reference element 38 and a thermal sensor 40. The reference element 38 and thermal sensor 40 are coupled together at junction 42. Thus, the refernece elements 38 and thermal sensor 40 are coupled in a bridge relationship with the signal generators 32 and 34.

The signal generators 32 and 34 provide substantially equal bias voltages, respectively, to the reference element 38 and thermal sensor 40. Thermal sensor 40 is heat sensitive and its response to impinging thermal energy changes its bias voltage in proportion to the intensity of the thermal energy. The voltage of the thermal sensor 40 is compared in the bridge circuit with the voltage of the reference element 38 and the output voltage at junction 42 is representative of the thermal energy impinging on the thermal sensor 40.

The technique is described mathematically as follows:

$$V_s = e_O/2 \, (C-C_O/C_O) \quad (1)$$

$$C-C_O = \Delta C = C_O(\Delta T/T-\theta) \quad (2)$$

$$V_s = [e_O/2(T-\theta)] \, \Delta T \quad (3)$$

where:
$e_O$ = signal generators voltage
$C_O$ = bias signal capacitance (reference)
$C$ = capacitance of the thermal sensor
$T$ = temperature
$\Delta T$ = temperature difference between the thermal sensor and reference element
$\theta$ = Curie temperature
$V_S$ = thermal signal voltage Referring now to FIG. 4 for a description of a detector structure 44 used in the ferroelectric imaging system, the detector structure 44 comprises the housing 26 which may be, for example, a stainless steel housing having a window 46 formed in one major surface. The window, for thermal energy, may be of, for example, a variety of glasses (silicon, cholcogenide, etc.), which transmit from the near IR through gamma rays, and germanium or indium which transmit, respectively, in the 8–14μm and 3–5μm infrared wavelengths. The window 46 is positioned in the light or thermal path to the detector matrix 14. The detector matrix 14 is mounted in a well formed in a substrate 48. The substrate 48 is a ceramic substrate of, for example, beryllium oxide and forms the surface of housing 26 opposite the window bearing surface. Space 50 between housing 26 and substrate 48 is preferably evacuated to form a vacuum. The substrate 48 acts as a heat sink for the detector matrix 14 and where the detector matrix requires heating is heated by electrical heater elements 49.

Figure 4:
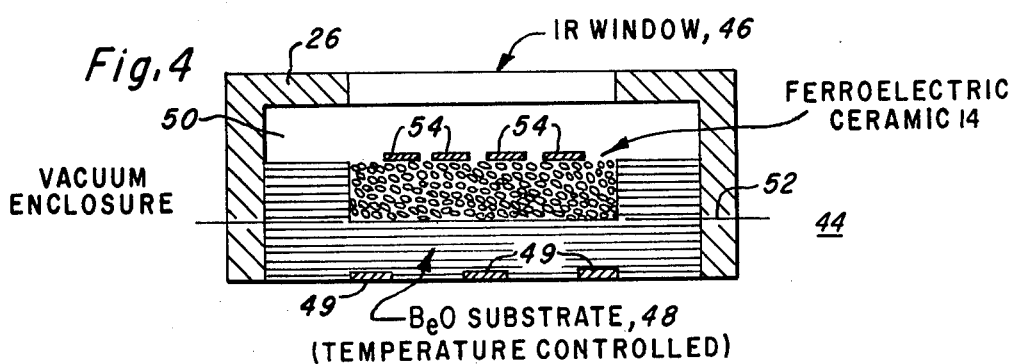
FIG. 4 is a cross-sectional view of the detector matrix for the ferroelectric imaging system.
Figure 5C:
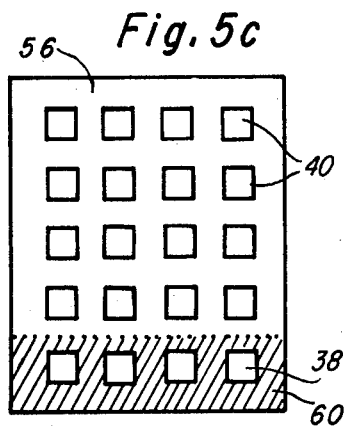
Figure 5B:
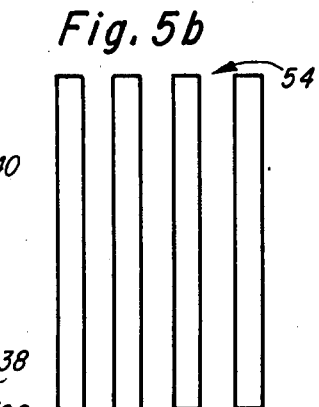

The ferroelectric material 56 (FIG. 5c) may be in slab form having the orthogonal lead patterns 52 and 54 (FIGS. 5a & b) formed thereon by evaporation/etching techniques; or if the ferroelectric material is a powder, the lead pattern 52 (FIG. 5a) for the back surface of the ferroelectric material is formed, for example, by the evaporation/etching technique in the bottom of the well of substrate 48 (FIG. 4). Next, the fine grain ferroelectric material 56 is poured into the well of substrate 48 over lead pattern 52. Next, the top surface of the material is sealed by either sputtering or by sintering prior to forming the top lead pattern 54 (FIG. 5b). Lead pattern 54 is formed, for example, by the evaporation/etching technique, and is mutually perpendicular to lead pattern 52. The intersection of the orthogonal lead patterns 52 and 54 together with the ferroelectric material 56 form the elements 38 and 40 of the detector matrix 14. The resulting detector matrix 14 is a plurality of such detector elements 38 and 40 represented by the squares of FIG. 5c. Squares in the unshaded area represent thermal sensors 40 and squares within the shaded area 60 represent reference elements 38. The shaded area 60 is a shielded row of detector elements; that is, a row of detectors is shielded, for example, by the housing 26 from thermal exposure to form a row of reference elements 38. The function of the thermal sensors and reference elements will be described hereinafter.

The ferroelectric material, i.e., a material having dielectric properties, preferably is one having a Curie temperature near ambient temperature (0° to 150° C) such as, for example, barium titanate ($BaTi_2O_3$), triglycine sulphate (TGS), barium strontium titanate, lead titanate, potassium dihydrogen phosphate, and Rochelle salt. Barium titanate having a Curie temperature of about 125° is preferred material. The thermal conductivity of the pure dense slab of barium titanate is much too high to achieve acceptable response levels; thus, a fine grain powder is used. The thermal conductivity of pressed powder is a function of the material, the degree of porosity, and the properties of the pores; it is controlled through trial and error.

Whichever ferroelectric material 56 is selected it must be used near its Curie temperature ($\theta$), i.e., temperature above which a ferroelectric material ceases to be spontaneously polarized. Above the Curie temperature barium titanate, is a cubic crystal structure strongly susceptible to polarization; thus, its dielectric constant is a strong function of the temperature. The detector elements, constructed as described above, form capacitors which are temperature dependent and are the basis for the ferroelectric transducer. This structure is to be contrasted to one utilizing ferroelectric material at temperatures well below its Curie temperature. At temperatures well below the Curie temperature ferroelectric material exhibits a spontaneous dipole moment. This produces an internal electric field and surface charges then accumulate to quench the field. Since the degree of polarization is temperature dependent, this is the basis for the pyroelectric vidicon. This detection technique, however, operates only when the radiation flux from the scene is constantly changing; the target, therefore, must be moving or the scene must be chopped mechanically.

Referring now to FIG. 6, the resolution of each thermal sensor 40 is shown by the dotted lines around the center square. The resolution of each thermal sensor 40 is limited by the extent of thermal spread within the dielectric of ferroelectric material 56. The effective thermal sensor size is determined by the center-to-center spacing of the thermal sensors. For a uniform, isotropic material slice placed in thermal contact with a heat sink, the thermal spread is about twice the thickness of the dielectric. Thus, the preferred dielectric thickness is about one mil and produces a modulation transfer efficiency of approximately 81 percent. Spatial frequency response is independent of the thermal properties of the dielectric for time invariant scenes.

Referring now to FIG. 7, there is shown the addressable detector matrix array. The addressable matrix array, as shown, includes a detector array 14 of twenty thermal sensors arranged in five rows 64–72 and four columns 74–80. Row 72 is shielded from the thermal energy to provide a row of reference elements 38 of the thermal sensors 40. It will be understood that the small number of thermal sensors and reference elements shown are to simplify the description of the invention and it will be appreciated by those skilled in the art that any number of sensors can be used to meet a particular display requirement. Also, as each detector element 38 or 40 is a thermal sensitive capacitor, they are shown as capacitors.

The detector matrix 14 is coupled to the drive and readout electronics 16 (FIG. 1). The drive electronics includes a scan multiplexer 82 (FIG. 7) and a pair of sine wave signal generators 32 and 34. Rows 64-70 of thermal sensors 40 are connected to outputs of the scan multiplexer 82; whilst row 72 of reference elements 38 is coupled to signal generator 32. Signal generator 34 is coupled to scan multiplexer 82. The readout electronics comprises preamplifiers 84-90 and a signal multiplexer 92. Columns 74-80 are connected, respectively, to the preamplifiers 84-90; and the signal multiplexer 92 is coupled to the outputs of the preamps 84-90. The signal multiplexer 92 multiplexes the detector matrix signals to the video processor 18.

Referring now to FIG. 8 for a description of the timing and control means 18 and another description of the drive and readout electronics 16. For the thermal sensors 40, rows 64-70 are coupled, respectively, to switches 94-100 forming the scan multiplexer 82. The switches 94-100 may be, for example, C-MOS transistors having their sources coupled to the junctions of rows 64-70 and grounded resistors 102-108. Resistors 102-108 discharge the thermal sensors 40 of rows 64-70 as they are inactivated. The drains of the C-MOS transistors 94-100 are connected to signal generator 34 which may be, for example, a square-wave generator. The gates of C-MOS transistors 94-100 are coupled to shift register 110 having outputs 112-118. A source of accurately timed pulses 120, hereinafter referred to as a clock, is connected to shift register 110. Shift register 110 may be, for example, a plurality of C-MOS stages that converts a sequence of input signals from clock 120 into a parallel binary number, by moving stored characters sequentially through outlets 112-118.

For an interlaced TV format every other row of thermal sensors 40 is sequentially charged in 1/60th of a second beginning, for example, with the top row and progressing downwardly every other row, and then sequentially charging the remaining thermal sensors 40 in 1/60th of a second beginning, for example, with the next to the top row. Thus, the matrix of thermal sensors are charged in 1/30th of a second. For the matrix of thermal sensors shown (FIG. 8) rows 64-70 are coupled to the outputs 112-118 of shift register 110 as follows: row 64 is coupled to output 112, row 68 to output 114, row 66 to output 116, and row 108 to output 118.

For row 72, the reference elements 38 are coupled to signal generator 32. Signal generator 32 may be, for example, a square wave generator. Signal generators 32 and 34 are coupled to ground 36, the reference elements 38 of row 72 are connected in series with the thermal sensors 40 in columns 74-80. Preamplifiers 122 are coupled to the junctions of the columns 74-80 of thermal sensors 40 and reference elements 38. Thus, as previously stated a bridge is formed and the preamplifiers receive signals indicative of the thermal energy impinging on the thermal sensors 40. Decoders 124 are connected to the peamplifiers to convert the modulated information to an analog form. The signal multiplexer 92 comprises, for example, four C-MOS transistors 126-132 acting as switches. The C-MOS transistors 126-132 have their drains coupled to the decoders 124, their sources to the video processor 18, and their gates to shift register 134 outputs 136-142. The shift register is coupled to a source of accurately timed pulses 144. Shift register 134 may be, for example, a plurality of C-MOS transistor stages that converts a sequence of input pulses from clock 144 into a parallel binary number by moving stored characters sequentially through outlets 136-142 to address switches 126-132 in sequence to read a difference signal for each thermal sensor of each row 64-70 as charged by the scan multiplexer 82. For the sixteen element matrix shown (FIG. 8) the shift register must sequence once each 480th of a second.

The video processor 18 may be, for example, any commercial type TV signal processor which processes the electrical signals of the signal multiplexer 92 into an interlaced TV format for display on a cathode ray tube.

In operation, the ferroelectric imaging system may be used in an infrared environment and is positioned with the IR lens system 12 in the path of infrared energy emanating from a scene. The lens system 12 focuses the infrared image of the scene onto the detector matrix 14. Then the scan multiplexer 82 upon command of the timing and control means 20 connects the generator 34 to row 64 to charge its thermal sensors 40. The charge of the generator is varied by the intensity of thermal energy impinging on each thermal sensor 40. The reference elements 38 are charged by generator 32. The signal multiplexer 92 upon command of the timing and control mechanism 18 closes the circuit through column 74. The current path of interest is from the positive terminal of upper generator 34, through the upper left thermal sensor 40 of row 64 down through the lead of column 74, through the reference element 38, and back to the negative side of the lower generator 32. A signal equal to the difference of the charges on the thermal sensor and the reference element is produced for amplification by the preamplifier 122, decoded by decoder 124 and passed to the video processor 18. Signal multiplexer 92 similarly connects sequentially the remaining thermal sensors 40 of row 64 to the remaining reference elements 38 of columns 76-80 to complete one cycle. The cycle is then repeated selectively for rows 66-70 to produce video signals representative of the scene for display on the cathode ray tube 22.

Although only a single embodiment of this invention has been described herein, it will be apparent to a person skilled in the art that various modifications to the details of construction shown and described may be made without departing from the scope of this invention.

What is claimed is:

1. A thermal imager comprising:
   (a) a drive circuit means for biasing a matrix of selectively spaced thermal sensitive capacitors;
   (b) a matrix of selectively spaced thermal sensitive capacitors connected to said drive means for biasing at a preselected potential;
   (c) means for positioning the matrix of selectively spaced thermal sensitive capacitors in a path of thermal energy emanating from a scene thereof, whereby the capacitance of each capacitor of the matrix of selectively spaced thermal sensitive capacitors is varied according to the intensity of the thermal energy impinging thereon; and
   (d) a signal processor means for reading out and producing display signals responsively to the varying potentials on the thermal sensitive capacitors of the matrix of selectively spaced thermal sensitive capacitors.

2. A thermal imager according to claim 1 wherein said matrix of selectively spaced thermal sensitive capacitors form an infrared detector matrix.

3. A thermal imager according to claim 2 wherein said signal processing means includes at least one reference capacitor connected to the drive circuit means and the infrared detector matrix of selectively spaced thermal sensitive capacitors for producing signals equal to the difference of the biasing potential on the thermal sensitive capacitors and the reference capacitor.

4. A thermal imager according to claim 2 wherein the signal processor means coupled to the infrared detector matrix includes a video processor coupled to the detector matrix for producing video signals, and a display means connected to the video processor for displaying the video signals.

5. A thermal imager according to claim 1 further including a thermal lens system for focusing the thermal energy emanating from the scene onto the matrix of selectively spaced thermal sensitive capacitors.

6. A thermal imager according to claim 1 wherein said matrix is an addressable matrix array of thermal sensitive capacitors.

7. A thermal imager according to claim 1 wherein the matrix of selectively spaced thermal sensitive capacitors includes a body of ferroelectric material sandwiched between a first and second plurality of spaced leads selectively arranged to form the matrix of spaced thermal sensitive capacitors, the body of ferroelectric material and leads forming, respectively, the dielectric and plates of the matrix of selectively spaced thermal sensitive capacitors.

8. A thermal imager according to claim 1 wherein said matrix of selectively spaced thermal sensitive capacitors includes a shield means for selectively shielding at least one capacitor of the matrix array of thermal sensitive capacitors from thermal energy emanating from the scene, said at least one shielded capacitor forming a reference capacitor for the matrix of selectively spaced thermal sensitive capacitors.

9. A thermal imager according to claim 7 wherein said dielectric of ferroelectric material includes ferroelectric material having a Curie point between about 0° and 150° centigrade for operation at temperatures near ambient temperature.

10. A thermal imager according to claim 7 wherein said dielectric of ferroelectric material is barium titanate.

11. A thermal imager according to claim 2 wherein the said detector matrix of thermal sensitive capacitors includes a first portion of thermal sensitive capacitors exposed to impinging thermal energy and a second portion of thermal sensitive capacitors, and further includes:

(a) a shield means for shielding the second portion of thermal sensitive capacitors from thermal energy emanating from the scene;

(b) a drive means including a signal source, said signal source coupled to the thermal sensitive capacitors shielded by the shield means to bias them to form a plurality of reference elements, and to a multiplexer, said multiplexer coupled to the first portion of the thermal sensitive capacitors for selectively biasing the first portion of thermal sensitive capacitors, said first portion of biased thermal sensitive capacitors responsive to impinging thermal energy to vary the bias potential; and (c) a readout means, said readout means including a multiplexer, said first and second portions of thermal sensitive capacitors connected to the multiplexer for producing selectively signals representative of the thermal energy impinging on the thermal sensitive capacitors.

12. A thermal imager according to claim 11 wherein the drive means and readout means includes a clock and gate means for controlling, respectively, the operation of the drive and signal multiplexers.

13. A ferroelectric imaging system comprising:

(a) a thermal lens system for focusing thermal energy emanating from a scene;

(b) a matrix of ferroelectric ceramic capacitors, a first portion of said ferroelectric ceramic capacitors in the optical path of the focused thermal energy, a shield, and a second portion of said ferroelectric ceramic capacitors shielded by the shield from the focused thermal energy;

(c) a drive means including first and second signal generators and a scan multiplexer, said first and second generators having terminals connected to a common ground, and to said first and second ferroelectric ceramic capacitors to form a bridge whereby the thermal energy impinging on the first portion of the ferroelectric ceramic capacitors changes the dielectric constant thereof in proportion to the intensity of the impinging thermal energy to vary the biasing potential and said bridge provides a difference potential indicative of the thermal energy impinging on the first portion of ferroelectric ceramic capacitors;

(d) a readout means including a plurality of preamplifiers coupled to junctions of the first and second portions of the ferroelectric ceramic capacitors, and a signal multiplexer coupled to the plurality of preamplifiers for selectively receiving amplified signals representative of the thermal energy impinging on the first portion of ferroelectric ceramic capacitors;

(e) a controller means including clocking and gate means for selectively actuating the scan multiplexer and signal multiplexer, respectively, of the drive and readout means;

(f) a video processor coupled to the signal multiplexer and controller for processing the electrical signals indicative of the thermal energy impinging on the first portion of ferroelectric ceramic capacitors into video signals; and (g) a display means connected to the video processor for visually displaying the thermal image of the scene.

14. A ferroelectric imaging system according to claim 13 wherein said thermal lens system is an IR lens system for focusing IR energy emanating from a scene.

15. A ferroelectric imaging system according to claim 13 further including a housing having major opposing sides, an IR window mounted in one of said major opposing sides for admitting IR energy, a substrate mounted in the other of said major opposing sides, the substrate having a well formed therein, a first lead pattern formed on the well side of the substrate, a layer of ferroelectric material forming a dielectric layer in the well over the first lead pattern, a second lead pattern orthogonally positioned as to the first lead pattern over the dielectric layer of ferroelectric material, said first and second orthogonal lead patterns coacting with the dielectric layer of ferroelectric material to form the matrix of ferroelectric ceramic capacitors, and wherein said housing has a portion forming the shield for shielding the second portion of said ferroelectric ceramic capacitors from thermal energy passing through the IR window to the first portion of said ferroelectric ceramic capacitors.

16. A ferroelectric imaging system according to claim 13 further including a housing having major opposing sides, a window mounted in one of said major opposing sides for admitting light, a substrate mounted in the other of said major opposing sides, said substrate supporting a dielectric of ferroelectric material having opposing major surfaces, and leads formed on the opposing major surfaces of the dielectric, the leads on one major opposing surface being mutually perpendicular to the leads on the other major opposing surface, the leads and dielectric coacting to form the matrix of ferroelectric ceramic capacitors.

17. A ferroelectric imaging system according to claim 15 further including a heater for maintaining the ferroelectric material substantially at its Curie temperature.

18. A ferroelectric imaging system according to claim 16 further including a heater for maintaining the dielectric of ferroelectric material at about its Curie temperature.

19. A method of fabricating a thermal imaging system comprising:
    (a) mounting on a substrate a matrix of thermal sensitive capacitors having dielectrics with Curie temperatures between about 0° C to about 150° C and at least one reference capacitor;
    (b) mounting the substrate supporting the matrix of thermal sensitive capacitors and at least one reference capacitor within a housing with the matrix of thermal sensitive capacitors in the optical path of the housing for detecting thermal energy emanating from a scene;
    (c) connecting the matrix of thermal sensitive capacitors and at least one reference capacitor to drive and readout electronics for selectively biasing the thermal sensitive capacitors and at least one reference capacitor, and reading out electrical signals representative of the thermal energy impinging on the matrix of thermal sensitive capacitors;
    (d) connecting the electrical signals indicative of the thermal image of the scene to a video processor for processing the signals into video signals; and
    (e) connecting the video signals to a display means for producing a visual display of the scene.

20. A method of fabricating a thermal imaging system according to claim 19 further comprising:
    attaching to the housing a lens system in the optical path from a scene to the matrix of thermal sensitive capacitors for focusing thermal energy emanating from the scene onto the matrix of thermal sensitive capacitors.

21. A method of fabricating a thermal imaging system according to claim 20 further comprising mounting a window in the housing between the lens system and the matrix of thermal sensitive capacitors, said window being transmissive of thermal energy.

22. A method of fabricating a thermal imaging system according to claim 19 wherein said matrix of thermal sensitive capacitors mounted in the substrate comprises forming a dielectric of a ferroelectric ceramic material, and forming spaced leads on opposing major surfaces of the dielectric; said leads on one of the major surfaces in an angular relationship as to the leads on the other major surface whereby the matrix of selectively spaced thermal sensitive capacitors are formed.

23. A method of fabricating a thermal imaging system according to claim 19 further comprising: heating the substrate to warm the dielectric of the matrix of thermal sensitive capacitors to about its Curie temperature.

24. A thermal imager according to claim 5 wherein the thermal lens system and matrix of selectively spaced thermal sensitive capacitors are stationary for forming a staring infrared detector system.

25. A thermal imager according to claim 9 further including a heater for heating the ferroelectric material to its Curie point.

26. A thermal imager according to claim 7 wherein the body of ferroelectric material is a slab.

27. A thermal imager according to claim 7 wherein the body of ferroelectric material is a powder having at least one side sintered for supporting a plurality of leads.

28. A thermal imager comprising:
    (a) a drive circuit;
    (b) a two dimensional detector array of ferroelectric thermal detector elements having first and second portions connected to the drive circuit for biasing, each detector element of the first portion responsive to thermal energy of a scene impinging thereon to vary the voltage at its output by an amount representative of the intensity of the impinging thermal energy, and the second portion providing reference output voltages;
    (c) a comparator means for comparing the outputs of the first and second portions of ferroelectric thermal detector elements of the two dimensional array; and
    (d) a signal processing means operatively connected to the comparator for producing video signals representative of the scene whereby an image representative of the thermal radiation from the scene is presented for display.

* * * * *